(12) United States Patent
Koyama et al.

(10) Patent No.: US 9,802,798 B2
(45) Date of Patent: Oct. 31, 2017

(54) HAND OPERATED PULLING AND LIFTING HOIST

(71) Applicant: KITO CORPORATION, Yamanashi (JP)

(72) Inventors: Koji Koyama, Yamanashi (JP); Nobuyoshi Mukawa, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 146 days.

(21) Appl. No.: 14/382,848

(22) PCT Filed: Feb. 21, 2013

(86) PCT No.: PCT/JP2013/054333
§ 371 (c)(1),
(2) Date: Sep. 4, 2014

(87) PCT Pub. No.: WO2013/133035
PCT Pub. Date: Sep. 12, 2013

(65) Prior Publication Data
US 2015/0014615 A1    Jan. 15, 2015

(30) Foreign Application Priority Data

Mar. 8, 2012 (JP) .................................. 2012-051474

(51) Int. Cl.
*B66D 3/02* (2006.01)
*B66D 3/14* (2006.01)
*F16G 11/12* (2006.01)

(52) U.S. Cl.
CPC ................. *B66D 3/02* (2013.01); *B66D 3/14* (2013.01); *F16G 11/12* (2013.01)

(58) Field of Classification Search
CPC ..................................... B66D 3/02; B66D 3/14
See application file for complete search history.

(56) References Cited

U.S. PATENT DOCUMENTS 2,453,581 A * 11/1948 Moore ..................... B66D 3/14
192/16
4,251,060 A * 2/1981 Suzuki ..................... B66D 3/14
192/16
(Continued)

FOREIGN PATENT DOCUMENTS

JP      54-42760      4/1979
JP      5-208798      8/1993

OTHER PUBLICATIONS

International Search Report dated May 7, 2013 in corresponding International Application No. PCT/JP2013/054333.

*Primary Examiner* — Sang Kim
*Assistant Examiner* — Nathaniel Adams
(74) *Attorney, Agent, or Firm* — Wenderoth, Lind & Ponack, L.L.P.

(57) ABSTRACT

A hand operated pulling and lifting hoist includes: a change gear that engages with a switching pawl fitting provided for an operation lever to convert a manual force applied to the operation lever into a hoist driving force; a fixed support ring disposed for the rotatable mounting of the operation lever about a driving member that is set about the drive shaft to transmit the hoist driving force to the drive shaft; a pivotable support ring formed on the operation lever and rotatably fitted to an internal circumference of the fixed support ring; and a driving-member contact prevention part on the change gear to prevent contact between the pivotable support ring and the driving member.

2 Claims, 6 Drawing Sheets

(56) References Cited

U.S. PATENT DOCUMENTS

| | | | | |
|---|---|---|---|---|
| 4,325,470 A * | 4/1982 | Bopp | B66D 3/14 192/16 |
| 4,348,011 A * | 9/1982 | Honda | B66D 1/58 192/223.1 |
| 4,420,144 A * | 12/1983 | Nishimura | B66D 3/14 254/345 |
| 4,463,933 A * | 8/1984 | Schreyer | B66D 5/14 188/218 XL |
| 4,469,308 A * | 9/1984 | Nakamura | B66D 3/14 192/43.1 |
| 4,512,555 A * | 4/1985 | Nakamura | B66D 3/14 192/101 |
| 4,664,357 A * | 5/1987 | Nishimura | B66D 1/58 254/351 |
| 4,768,754 A * | 9/1988 | Nishimura | B66D 1/58 254/351 |
| 5,088,694 A * | 2/1992 | Nishimura | B66D 3/14 254/352 |
| 5,149,058 A * | 9/1992 | Nishimura | B66D 3/14 254/352 |
| 5,238,226 A * | 8/1993 | Nishimura | B66D 3/14 254/352 |
| 5,351,937 A * | 10/1994 | Nishi | B66D 3/14 254/352 |
| 5,472,171 A * | 12/1995 | Nishi | B66D 3/14 254/352 |
| 5,575,457 A * | 11/1996 | Inoue | B66D 3/14 192/95 |
| 5,769,398 A * | 6/1998 | Samejima | B66D 3/14 192/95 |
| 5,791,579 A * | 8/1998 | Raphael | B66D 3/14 192/56.1 |
| 6,059,267 A * | 5/2000 | Nishimura | B66D 3/14 192/95 |
| 6,406,001 B1 * | 6/2002 | Wada | B66D 3/14 254/352 |
| 6,517,054 B2 * | 2/2003 | Samejima | B66D 3/14 254/346 |
| 7,344,121 B1 * | 3/2008 | Pan | B66D 1/58 254/346 |
| 7,575,223 B2 * | 8/2009 | Xia | B66D 1/58 254/342 |
| 7,614,610 B2 * | 11/2009 | Xia | B66D 3/16 254/358 |
| 8,047,348 B2 * | 11/2011 | Pan | B66D 3/02 192/56.62 |

* cited by examiner

HAND OPERATED PULLING AND LIFTING HOIST

TECHNICAL FIELD

The present invention relates to a hand operated pulling and lifting hoist that is used when hoisting or pulling heavy load.

BACKGROUND

Figure 5:
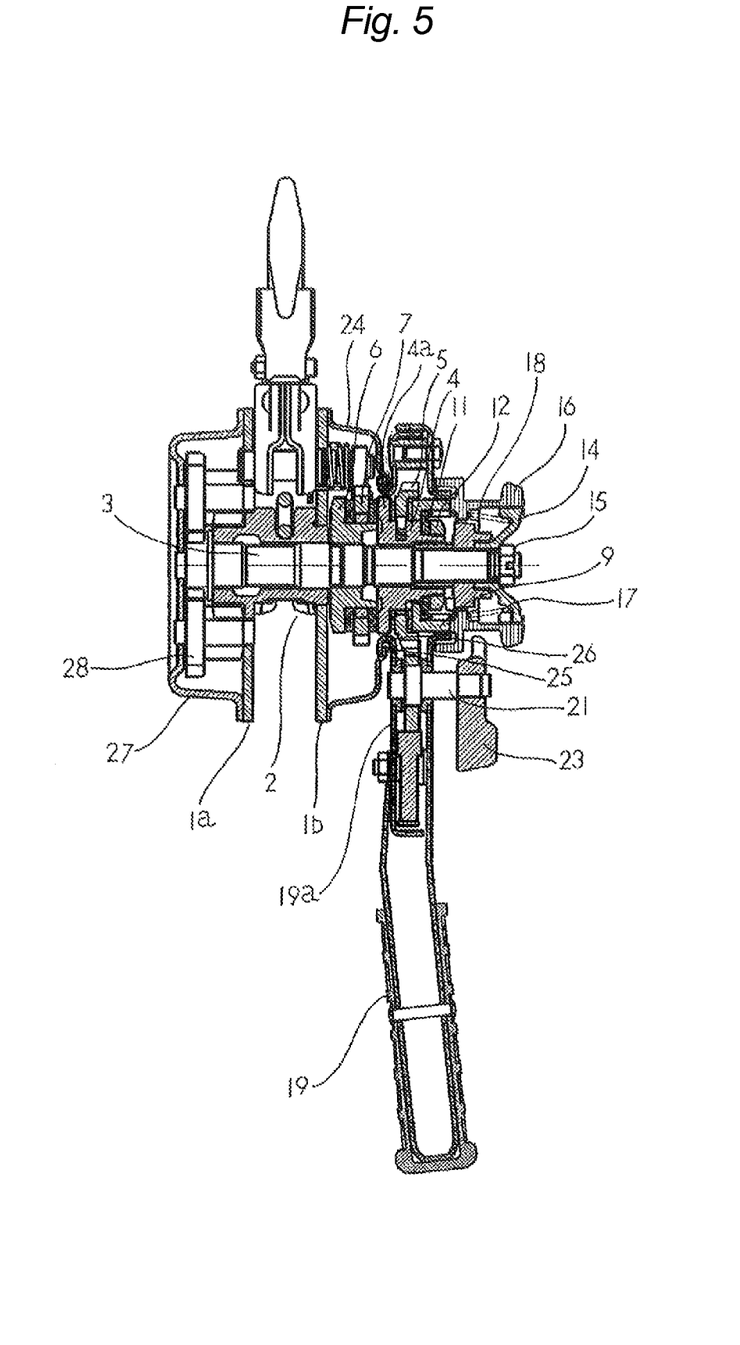
FIG. 5 is a cross-sectional view showing a conventional hand operated pulling and lifting hoist.

Patent Literature 1 proposes a lever support device in a hand operated pulling and lifting hoist that includes an overload protection device. As shown in FIG. 5, this lever support device has a structure in which a fixed support ring 25 is formed on a brake cover 24 that is fixed to a frame 1b, and the fixed support ring 25 is fitted to a pivotable support ring 26 that is provided on an inner lever 19a of an operation lever 19 in such manner that pivotable support ring 26 is pivotable but unable to move along the longitudinal direction of a drive shaft 3.

Figure 6:
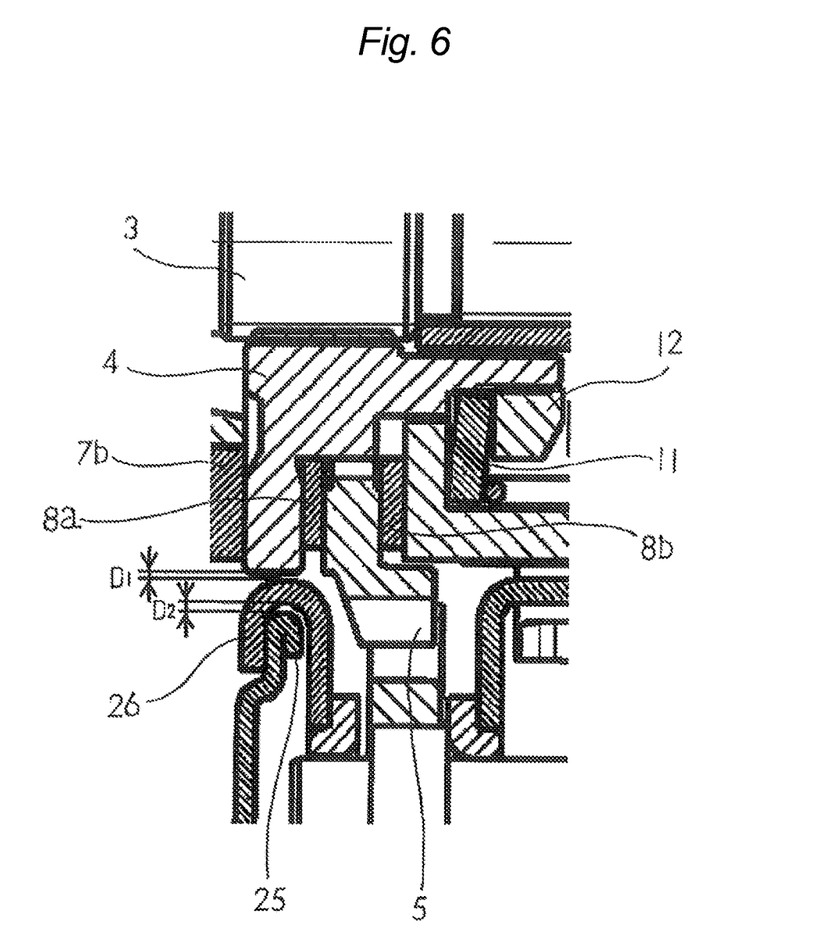
FIG. 6 is a cross-sectional view of an enlarged essential part of the hand operated pulling and lifting hoist shown in FIG. 5.

The applicant has implemented the above-configured lever support device in a hand operated pulling and lifting hoist described in Patent Literature 2. As shown in FIG. 6, in the hand operated pulling and lifting hoist, a pivotable support ring 26 of an operation lever 19 is pivotally fitted via a clearance $D_1$ to an external circumference of a driving member 4 that is screwed to a drive shaft 3. Further, a radial gap $D_2$, which is larger than the clearance $D_1$, is provided against a fixed support ring 25 formed on a brake cover 24 that is fixed to a frame 1b. Thus, the hand operated pulling and lifting hoist described in Patent Literature 2 prevents generation of sliding friction between the fixed support ring 25 and the pivotable support ring 26 during clockwise and counterclockwise rotation of the operation lever 19, whereby wear in a part where the fixed support ring 25 and the pivotable support ring 26 come in contact and associated rattling are prevented following an extended period of use.

Figure 1:
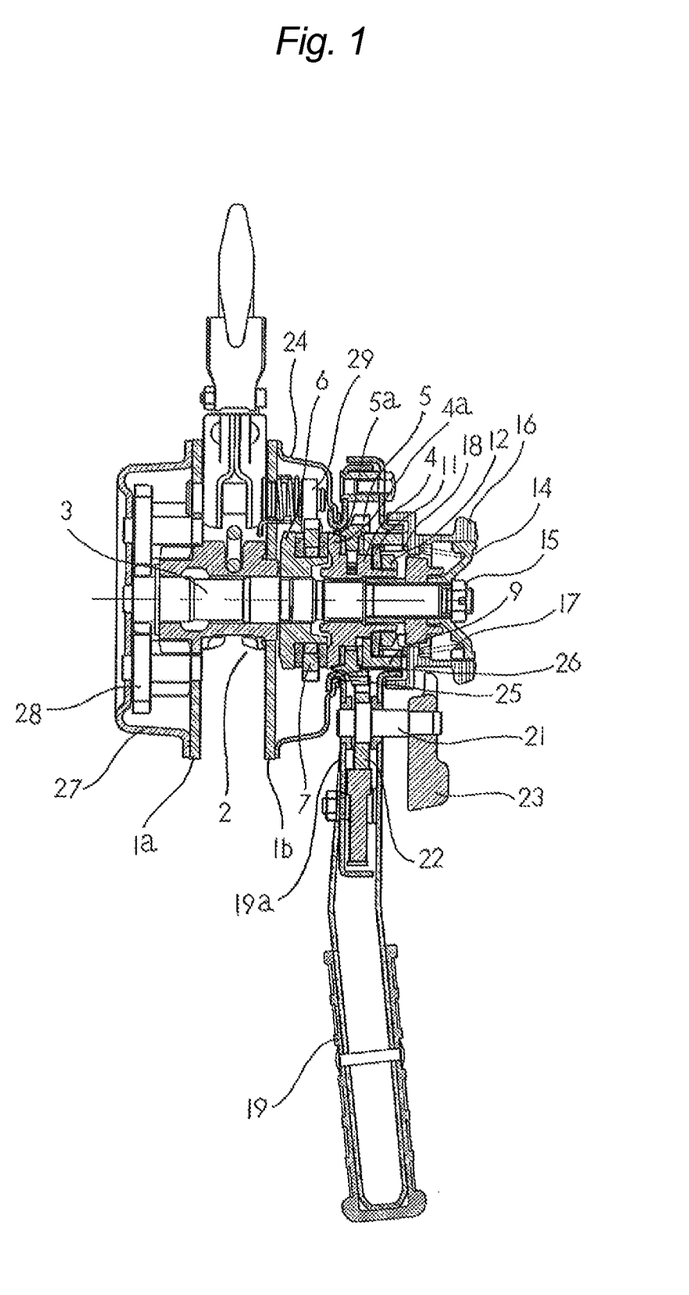
FIG. 1 is a cross-sectional view showing a first embodiment of a hand operated pulling and lifting hoist according to the invention.

It is noted that, in FIGS. 5 and 6, the reference sign 5 denotes a change gear, the reference sign 6 denotes a driven member, the reference sign 7 denotes a brake ratchet wheel, the reference signs 8a, 8b denote friction facings, the reference sign 9 denotes a disc member, the reference sign 11 denotes a disc spring, and the reference sign 12 denotes an adjusting nut. The reference sign 14 denotes a locking member, the reference sign 16 denotes a grip, and the reference signs 17, 18 denote coil springs. As for other components, the same reference signs as those shown in FIG. 1 are assigned and explanation thereof will be omitted.

CITATION LIST

Patent Literature 1: Japanese Patent No. 4211883
Patent Literature 2: Japanese Examined Utility Model (Registration) Application Publication No. 63-8711

SUMMARY

Unfortunately, during operation of an operation lever 19 in the hand operated pulling and lifting hoist described in Patent Literature 2, in addition to the torque transmitted from a change gear 5 via friction facings 8a, 8b, which compose an overload protection device, another torque can be produced as a pivotable support ring 26 provided on an inner lever 19a comes in contact with an external circumference of a driving member 4. In such case, a sum of the torques is transmitted from the operation lever 19 to the driving member 4; therefore, the torque varies when transmitted without passing through a friction clutch of the overload protection device. Accordingly, the hand operated pulling and lifting hoist described in Patent Literature 2 has a problem that torque setting through the overload protection device is unstable and thus torque adjustment is time consuming.

In order to solve the above problem, a hand operated pulling and lifting hoist of the present invention includes: a drive shaft coupled to a load sheave that hoists a load such that a rotary drive force is transmitted to thereto; an operation lever mounted so as to rotate about the drive shaft; a change gear engaged with a switching pawl fitting provided for the operation lever to convert a manual force applied to the operation lever to a hoist driving force; a driving member attached to the drive shaft to transmit the hoist driving force thereto; a transmission torque adjusting means set on a sleeve of the driving member together with the change gear to adjust a limit value of the hoist driving force to be transmitted from the change gear to the driving member; a fixed support ring disposed about the driving member for the rotatable mounting of the operation lever; a pivotable support ring formed on the operation lever, rotatably fitted to an internal circumference of the fixed support ring; and a driving-member contact prevention part on the change gear for preventing contact between the pivotable support ring and the driving member.

Preferably, the driving member of the hand operated pulling and lifting hoist according to the invention comprises a sleeve and a flange, and has a transmission torque-adjusting press member at an end of the flange for adjusting a pressing force acting between the change gear and the flange and a rotary force to be transmitted between the change gear and the driving member. Preferably, the driving-member contact prevention part is a projection projecting from a side of the change gear toward the exterior of an external circumference of the flange of the driving member.

Further, the external circumference of the flange in the hand operated pulling and lifting hoist of the present invention preferably has a circular notch for accommodating an internal circumference of the projection.

Furthermore, in the hand operated pulling and lifting hoist of the present invention, preferably, the pivotable support ring is rotatably supported by an external circumference of the projection of the change gear.

In accordance with a hand operated pulling and lifting hoist of the invention, direct transmission of torque from a pivotable support ring provided on an operation lever to a driving member can be prevented, which facilitates the adjusting of the transmissible torque, and also, the torque value is stabilized.

DETAILED DESCRIPTION

Figure 2:
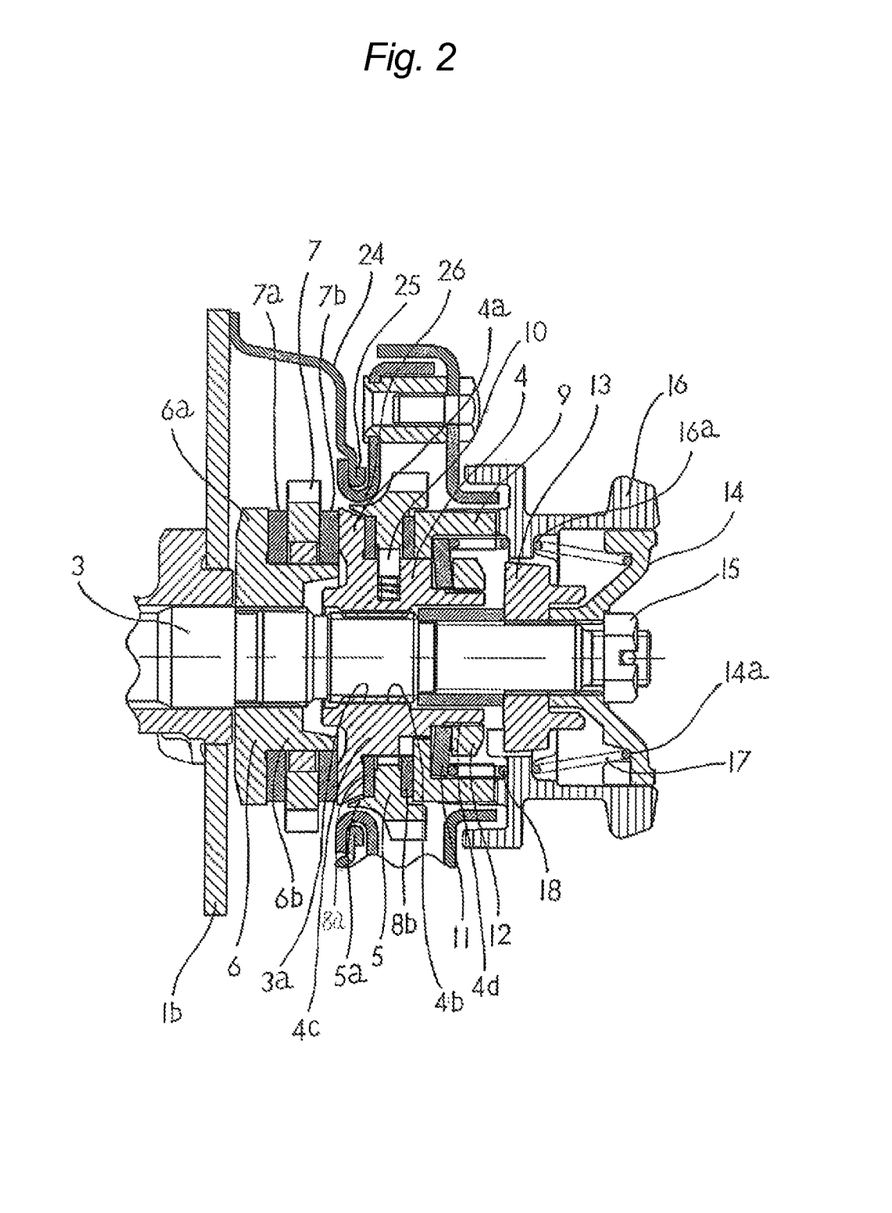
FIG. 2 is a cross-sectional view of an enlarged essential part of the hand operated pulling and lifting hoist shown in FIG. 1.

FIG. 1 is a cross-sectional view showing a first embodiment of a hand operated pulling and lifting hoist according to the invention. FIG. 2 is a cross-sectional view of an enlarged essential part of the hand operated pulling and lifting hoist shown in FIG. 1.

In FIGS. 1 and 2, reference numeral 1a, 1b represent a pair of frames of the hand operated pulling and lifting hoist. A load sheave 2 as a drive wheel for winding up a load chain or the like is disposed perpendicularly between the frames 1a, 1b. A drive shaft 3 for driving the load sheave 2 penetrates through the center of the load sheave 2 such that the load sheave 2 is pivotally attached to the drive shaft 3. A reduction gear 28 is accommodated in a gear box 27, which reduction gear 28 couples the drive shaft 3 and the load sheave 2, meshing with a pinion disposed at the end of the drive shaft 3 and a load gear provided on the load sheave 2. The gear box 27 is secured to the frame box 1a. A front end of the drive shaft 3 extending from the frame 1a to the side of the gear box 27 is movably supported by the gear box 27. Further, an external thread 3a is provided on the drive shaft 3 at a section extending to the side of a brake cover 24 containing a brake, which will be described later. An internal thread 4b of a driving member 4 having a change gear 5 is screwed onto the external thread 3a, such that a driven member 6 is non-rotatably fitted to the drive shaft 3 between the frame 1b and the driving member 4.

The driven member 6 includes a flange 6a and a sleeve 6b. On the sleeve 6b, a brake ratchet wheel 7 and brake friction facings 7a, 7b flanking the brake ratchet wheel 7 are set rotatably relative to the driven member 6. In an upper section of the frame 1b, a pawl 29 is provided so as to mesh with the brake ratchet wheel 7 and disable the brake ratchet wheel 7 to rotate in the lowering direction.

The driving member 4 is screw-fixed to the drive shaft 3 by means of the external thread 3a and the internal thread 4b. A screw force (fastening force) acting between the drive shaft 3 and the driving member 4 presses a disc flange 4a disposed on the driving member 4, the driven member 6, the brake ratchet wheel 7, and the brake friction facings 7a, 7b into a unit as a brake mechanism (mechanical brake). Thus, when a load is applied to the load sheave 2, the load is decelerated and held by the brake mechanism. A hoist driving force transmitted from an operation lever 19 through the change gear 5 to the driving member 4 can be transmitted from the driving member 4 to the drive shaft 3 due to the function of the brake mechanism. The driving member 4 has the flange 4a that is in contact with the brake friction facing 7b and a large-diameter sleeve 4c and a small-diameter sleeve 4d extending from the flange 4a in the opposite direction from the friction facing 7b. The change gear 5, a pair of friction facings 8a, 8b flanking the change gear 5, and a disc member 9 abutting against the friction facing 8b are set on the large-diameter sleeve 4c. The change gear 5 is provided with a driving-member contact prevention part in the form of a projection 5a, projecting between a pivotable support ring 26 and the flange 4a of the driving member 4. The small-diameter sleeve 4d is provided with a disc spring 11 and a transmission torque-adjusting press member in the form of an adjusting nut 12 threadedly engaged with an external thread on the small-diameter sleeve 4d. The flange 4a of the driving member 4, the friction facings 8a, 8b, the disc member 9, the disc spring 11, and the adjusting nut 12 compose a torque adjusting means, which is a friction clutch of an overload protection device.

As the adjusting nut 12 is rotationally moved toward the disc spring 11, the disc member 9 presses the change gear 5 through the friction facing 8b, and in turn the change gear 5 presses a side face of the flange 4a of the driving member 4 through the friction facing 8a. In this way, the transmission torque can be adjusted. It is noted that the disc member 9 is adapted to be non-rotatable relative to the driving member 4. Therefore, unless the change gear 5 is applied with a force that is greater than the frictional resistance between the change gear 5 and friction facings 8a, 8b, the frictional resistance between the change gear 5 and friction facings 8a, 8b will serve to maintain the non-rotatable state of the change gear 5 relative to the driving member 4.

Consequently, the force applied to the change gear 5 to rotate the change gear 5 is transmitted to the driving member 4 as-is in the form of a force to rotate the driving member 4. On the other hand, when a force that is greater than the frictional resistance between the change gear 5 and friction facings 8a, 8b is applied to the change gear 5, slip generates between the change gear 5 flanked by the friction facings 8a, 8b and the driving member 4, whereby overload lifting is prevented for the hand operated pulling and lifting hoist.

Further, in the hand operated pulling and lifting hoist, the frictional resistance adjustment is possible between the flange 4a of the driving member 4, the change gear 5, the friction facings 8a, 8b, and the disc member 9 by moving forward and backward the adjusting nut 12 relative to the disc spring 11, as described above. Thus, torque values transmitted from the operation lever 19 to the driving member 4 are adjustable. Furthermore, a one-way clutch 10 is disposed between the driving member 4 and the change gear 5 such that the change gear 5 does not run idle relative to the driving member 4 during lowering operation.

At an end of the drive shaft 3 exterior to the external thread 3a (corresponding to the right side section in FIG. 2), a support cylinder 13 and then a locking member 14 are fitted non-rotatably relative to the drive shaft 3, and fixed by a nut 15.

A coil spring 17 is disposed between the locking member 14 and a grip 16 disposed at an external circumference of the locking member 14. One end of the coil spring 17 is locked into a spring retainer 14a disposed on the locking member 14; the other end is locked into a spring retainer 16a disposed on the grip 16. The coil spring 17 energizes the grip 16 in a direction that the grip 16 is rotationally moved relative to the drive shaft 3, and this energizing force of the coil spring 17 acts to loosen brake by the above-mentioned brake mechanism.

A coil spring 18 is disposed between the disc member 9 and the grip 16. The coil spring 18 energizes the disc member 9 in a direction that the disc member 9 is rotationally moved relative to the grip 16, and this energizing force of the coil spring 18 acts to tighten the above-mentioned brake mechanism to activate the above-mentioned brake mechanism.

The support cylinder 13, the locking member 14, the grip 16, the coil spring 17, and the coil spring 18 together makes an idling device for switching between activation and loosening of the above-mentioned brake mechanism.

A pivot 21 is pivotally mounted to a proximal end of the operation lever 19 at a section adjacent to an external circumference of the change gear 5. To this pivot 21, a switching pawl fitting 22 and a change knob 23 are secured.

The switching pawl fitting 22 is provided with: a pawl for rotating the change gear 5 in a direction that a load chain is wound up; a pawl for rotating the change gear 5 in a direction that a load chain is wound down; an engagement part for keeping an operational position in either wind-up or wind-down direction; and an engagement part for keeping a neutral position.

The driven member 6, the brake ratchet wheel 7, the friction facings 8a, 8b, and the pawl 29 are enclosed by a metallic brake cover 24 attached to the frame 1b. A fixed support ring 25 is formed by stamping along a smallest-diameter edge of the brake cover 24, which is bent to have a U-shaped cross section. The fixed support ring 25 is disposed exterior to an external circumference of the driving member 4, provided with a radial gap relative to the flange 4a. The proximal end of the inner lever 19a of the operation lever 19 is provided with a pivotable support ring 26 having a U-shaped cross section formed by stamping at a section opposing the brake cover 24. The pivotable support ring 26 is pivotally fitted to the fixed support ring 25 with a predetermined gap such that the fixed support ring 25 provided on the brake cover 24 is enclosed from the radial inside.

Similarly to the hand operated pulling and lifting hoist shown in FIG. 6, a radial gap $D_2$ is provided between the pivotable support ring 26 and the fixed support ring 25, such that the pivotable support ring 26 is unable to move axially relative to the brake cover 24 while enabled to move rotationally about the drive shaft 3. A gap $D_1$ is also provided between an internal circumference of the pivotable support ring 26 and an external circumference of the change gear 5. It is noted that the gap $D_1$ is set to be smaller than the gap $D_2$. The operation lever 19 is supported only radially by the pivotable support ring 26 exterior to the external circumference of the projection 5a of the change gear 5.

The change gear 5 along with the driving member 4 moves forward and backward in the axial direction of the drive shaft 3. Thus, there is provided a predetermined gap between a side face of the change gear 5 and the pivotable support ring 26 in the axial direction of the drive shaft 3.

In the hand operated pulling and lifting hoist shown in FIGS. 1 and 2, as described above, the projection 5a is provided on the change gear 5, projecting between the pivotable support ring 26 and the flange 4a of the driving member 4 so that the pivotable support ring 26 is pivotally supported by the external circumference of the projection 5a in a loose fitting state while the operation lever 19 is being operated. Accordingly, contact between the pivotable support ring 26 and the flange 4a of the driving member 4 can be avoided. Hence, direct transmission of torque from the pivotable support ring 26 provided on the operation lever 19 to the driving member 4 can be prevented, which facilitates the adjusting of the transmissible torque, and in addition, the torque value is stabilized. Furthermore, a smaller amount of manual force (hand operated pulling force) will suffice to operate the operation lever 19. Moreover, the projection 5a allows downsizing of the hand operated pulling and lifting hoist in the axial direction of the drive shaft 3. Thus, the apparatus can be made compact.

As shown in FIG. 2, the circular projection 5a has a tapered shape with an inclined plane at its inner circumference. An outer diameter of the flange 4a of the side that comes in contact with the brake friction facing 7b is larger than another outer diameter that comes in contact with the friction facing 8a; and an inner diameter of the projection 5a is smaller than the outer diameter of the flange 4a of the side that comes in contact with the brake friction facing 7b. Thus, the internal circumference surface of the projection 5a and an external circumference surface of the flange 4a are disposed opposite and parallel to each other with a predetermined gap therebetween.

Figure 3:
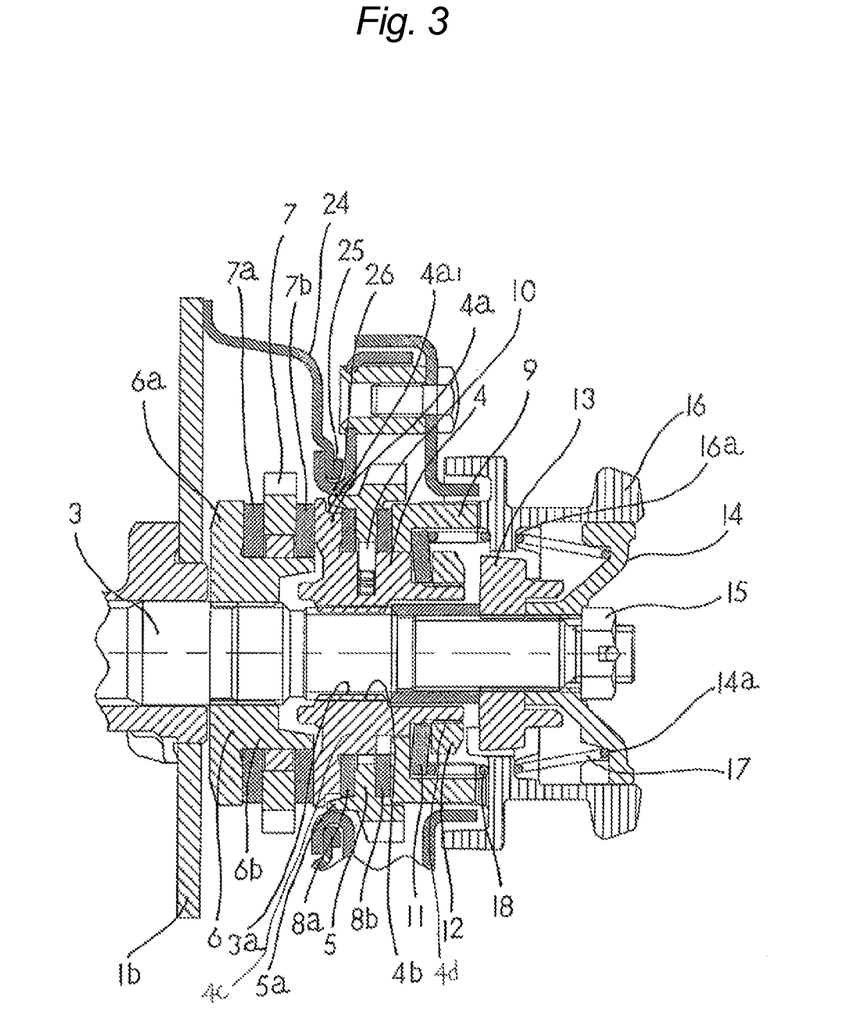
FIG. 3 is a cross-sectional view of an enlarged essential part of a second embodiment of the hand operated pulling and lifting hoist according to the invention.

FIG. 3 is a cross-sectional view of an enlarged essential part showing a second embodiment of a hand operated pulling and lifting hoist according to the invention. For the second embodiment, the same parts as in the first embodiment are assigned the same reference signs in FIG. 3 and explanation thereof will be omitted.

In the hand operated pulling and lifting hoist shown in FIG. 3, an external circumference of a flange 4a is provided with a circular notch $4a_1$. An internal circumference surface of a projection 5a is loosely fit in the notch $4a_1$. Due to this circular notch $4a_1$ provided in the external circumference of the flange 4a for accommodating the internal circumference of the projection 5a, the hand operated pulling and lifting hoist shown in FIG. 3 is allowed to have a smaller diameter of a drive shaft 3 and hence the hoist is downsized.

Figure 4:
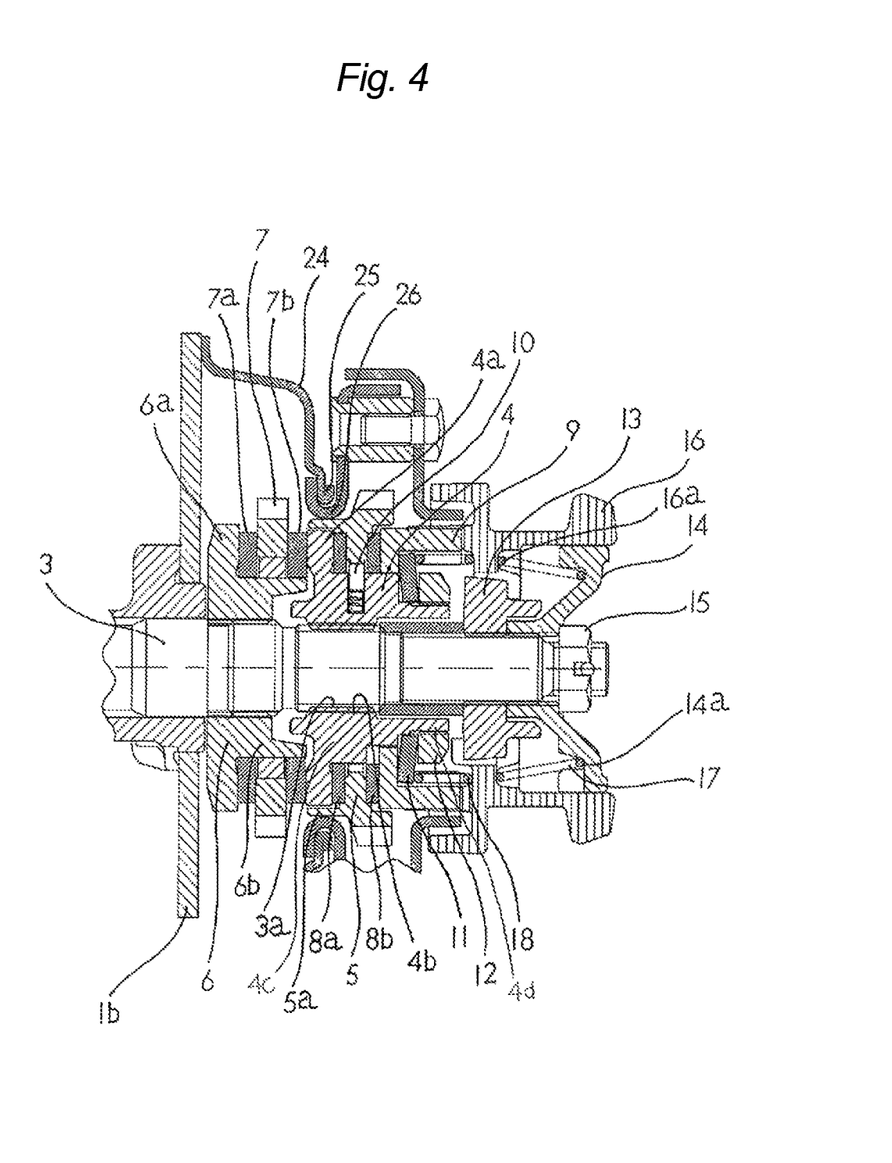
FIG. 4 is a cross-sectional view of an enlarged essential part showing a third embodiment of the hand operated pulling and lifting hoist according to the invention.

FIG. 4 is a cross-sectional view of an enlarged essential part showing a third embodiment of a hand operated pulling and lifting hoist according to the invention. For the third embodiment, the same parts as in the first embodiment are assigned the same reference signs in FIG. 4 and explanation thereof will be omitted.

In the hand operated pulling and lifting hoist shown in FIG. 4, an outer diameter of a flange 4a and outer diameters of friction facings 8a, 8b are same and an internal circumference surface of a projection 5a is disposed in and along an external circumference surface of the flange 4a.

It is noted that a projection 5a provided on a change gear 5 in the above embodiments preferably has a continuous circular shape; however, it may have non-continuous yet concentric circular shapes.

An exemplary overload protection device has been shown in the form of a friction clutch including friction facings 8a, 8b; however, other structure may also be employed provided that one has a mechanism capable of controlling transmissible torque by idling between a change gear 5 and a driving member 4.

In all three embodiments, a load sheave 2 and a drive shaft 3 for driving the load sheave 2 are rotatably mounted to frames 1a, 1b; the drive shaft 3 is fitted to a driven member 6 and screw-fitted to a driving member 4 that rotates via a switching pawl fitting 22 and a change gear 5. A brake ratchet wheel 7 and friction facings 7a, 7b are set between the driving member 4 and the driven member 6. A pivotable support ring 26 and an inner lever 19a disposed at a proximal end of an operation lever 19 are integrally formed, and the pivotable support ring 26 is pivotally fitted to a fixed support ring 25 that is integrally formed with a brake cover 24 fixed to the frame 1b. The driving member 4 consists of a flange 4a, a large-diameter sleeve 4c, and a small-diameter sleeve 4d. The large-diameter sleeve 4c has the change gear 5, friction facings 8a, 8b, and a disc member 9 set thereon, and the small-diameter sleeve 4d has a disc spring 11 and an adjusting nut 12 screwed thereonto, which adjusting nut 12 being a transmission torque-adjusting press member to press the disc spring 11. The change gear 5 is provided with a projection 5a projecting between the pivotable support ring 26 provided on the operation lever 19 and the flange 4a of the driving member 4. An external circumference surface of the projection 5a pivotally supports an internal circumference of the pivotable support ring 26 in an idling state so that contact between the operation lever 19 and the driving member 4 is prevented. Thus, the projection 5a provided on the change gear 5 prevents contact between the operation lever 19 and the driving member 4, whereby generation of torque caused by contact between the pivotable support ring 26 and an external circumference of the driving member 4 can be prevented. Accordingly, transmissible torque can be easily adjusted, and the torque value is stabilized. A smaller amount of manual force (hand operated pulling force) will suffice to operate the operation lever 19. Moreover, the hand operated pulling and lifting hoist can be made compact.

REFERENCE SIGNS LIST 2 load sheave
3 drive shaft
4 driving member
4a flange
$4a_1$ notch
4c large-diameter sleeve
4d small-diameter sleeve
5 change gear
5a projection
8a,8b friction facings
9 disc member
12 adjusting nut
19 operation lever
22 switching pawl fitting
25 fixed support ring
26 pivotable support ring A hand operated pulling and lifting hoist according to the invention prevents direct transmission of torque from a pivotable support ring provided on an operation lever to a driving member, whereby adjustment of transmissible torque is facilitated and the torque value is stabilized. Accordingly, performance of the hand operated pulling and lifting hoist is improved.

The invention claimed is:
1. A hand operated pulling and lifting hoist comprising:
a pair of frames;
an operation lever at a proximal end of which an inner lever is disposed;
a switching pawl fitting provided for the operation lever;
a brake cover fixed to one of the frames;
a load sheave and a drive shaft rotatably mounted to the frames;
a driven member fitted to the drive shaft;
a driving member screw-fitted to the drive shaft, the driving member consisting of a flange, a large-diameter sleeve and a small-diameter sleeve;
a brake ratchet wheel and a pair of first friction facings set between the driven member and the driving member, the first friction facings flanking the brake ratchet;
a fixed support ring integrally formed with the brake cover;
a pivotable support ring integrally formed with the inner lever of the operation lever, the pivotable support ring pivotally fitted to the fixed support ring;
a change gear, a pair of second friction facings, and a disc member set on the large-diameter sleeve of the driving member, the change gear rotating the driving member together with the switching pawl fitting, the second friction facings flanking the change gear, and the disc member abutting against one of the second friction facings;
a disc spring and an adjusting nut screwed onto the small-diameter sleeve of the driving member; and
a projection provided for the change gear, the projection projecting between the pivotable support ring and the flange of the driving member,
wherein an external circumference surface of the projection pivotally supports an internal circumference of the pivotable support ring in an idling state and prevents from contacting the pivotable support ring to the flange of the driving member.
2. The hand operated pulling and lifting hoist according to claim 1, wherein the external circumference of the flange of the driving member has a circular notch for accommodating an internal circumference of the projection.

* * * * *